(12) United States Patent
An et al.

(10) Patent No.: US 9,678,316 B2
(45) Date of Patent: Jun. 13, 2017

(54) APPARATUS FOR FABRICATING LENS, METHOD OF FABRICATING LENS, AND LENS

(71) Applicant: LG INNOTEK CO., LTD., Seoul (KR)

(72) Inventors: Myoung Jin An, Seoul (KR); Seung Man Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/411,764

(22) PCT Filed: Sep. 26, 2012

(86) PCT No.: PCT/KR2012/007777
§ 371 (c)(1),
(2) Date: Dec. 29, 2014

(87) PCT Pub. No.: WO2014/003242
PCT Pub. Date: Jan. 3, 2014

(65) Prior Publication Data
US 2015/0146311 A1 May 28, 2015

(30) Foreign Application Priority Data
Jun. 28, 2012 (KR) .................. 10-2012-0070357

(51) Int. Cl.
*G02B 7/02* (2006.01)
*B29C 45/00* (2006.01)
(Continued)

(52) U.S. Cl.
CPC ...... *G02B 13/0085* (2013.01); *B29C 35/0805* (2013.01); *B29C 43/021* (2013.01);
(Continued)

(58) Field of Classification Search
CPC . G02B 7/02; G02B 3/0056; B29L 2011/0016; B29C 33/3842; B29C 45/78
(Continued)

(56) References Cited

U.S. PATENT DOCUMENTS 5,837,314 A 11/1998 Beaton et al. ............... 427/133
6,693,748 B1 2/2004 Fujimoto et al. ............ 359/621
(Continued)

FOREIGN PATENT DOCUMENTS

JP 2012-063723 A 3/2012
KR 10-2010-0030255 A 3/2010
(Continued)

OTHER PUBLICATIONS

International Search Report dated Mar. 25, 2013 issued in Application No. PCT/KR2012/007777 (Full English Text).
(Continued)

*Primary Examiner* — William Choi
(74) *Attorney, Agent, or Firm* — KED & Associates, LLP

(57) ABSTRACT

Disclosed are an apparatus for fabricating a lens. The apparatus for fabricating a lens includes a molding frame to receive a source material injected through an injection port, and a light source or a heat source to irradiate a light or a heat onto the source material in the molding frame. The molding frame includes a plurality of molding grooves adjacent to each other and at two connection passages to connect the molding grooves to each other.

11 Claims, 7 Drawing Sheets

(51) Int. Cl.
  *G02B 13/00* (2006.01)
  *B29C 43/02* (2006.01)
  *B29C 43/36* (2006.01)
  *B29C 35/08* (2006.01)
  *B29L 11/00* (2006.01)

(52) U.S. Cl.
  CPC ............ *B29C 43/3607* (2013.01); *G02B 7/02* (2013.01); *B29L 2011/0016* (2013.01)

(58) Field of Classification Search
  USPC .......... 359/619, 811; 264/2.5; 425/144, 547, 425/588
  See application file for complete search history.

(56) References Cited

U.S. PATENT DOCUMENTS

| | | | | |
|---|---|---|---|---|
| 8,416,514 B2* | 4/2013 | Kim | ................ | B29D 11/00403 359/811 |
| 2003/0207484 A1 | 11/2003 | Nishikawa | ...................... | 438/31 |
| 2006/0078637 A1 | 4/2006 | Goruganthu et al. | ..... | 425/174.4 |
| 2007/0029277 A1 | 2/2007 | Jacobowitz et al. | ............ | 216/24 |
| 2010/0073782 A1* | 3/2010 | Kim | ....................... | G02B 7/022 359/819 |
| 2010/0176522 A1 | 7/2010 | Naito et al. | ..................... | 264/1.1 |
| 2010/0321802 A1 | 12/2010 | Kim et al. | ..................... | 359/811 |
| 2012/0194923 A1 | 8/2012 | Um | | |

FOREIGN PATENT DOCUMENTS

| | | |
|---|---|---|
| KR | 10-2010-0067082 A | 6/2010 |
| TW | 200815184 A | 4/2008 |
| TW | 200936367 A | 9/2009 |
| WO | WO 2007/018938 A1 | 2/2007 |

OTHER PUBLICATIONS

Korean Office Action dated Sep. 27, 2013 issued in Application No. 10-2012-0070357.
Taiwan Office Action dated Nov. 26, 2014 issued in Application No. 2012-136352.

* cited by examiner

APPARATUS FOR FABRICATING LENS, METHOD OF FABRICATING LENS, AND LENS

CROSS-REFERENCE TO RELATED PATENT APPLICTIONS

This application is a U.S National Stage Application under 35 U.S.C. §371 of PCT Application No. PCT/KR2012/007777, filed Sep. 26, 2012, which claims priority to Korean Patent Application No. 10-2012-0070357, filed Jun. 28, 2012, whose entire disclosures are hereby incorporated by reference.

TECHNICAL FIELD

The embodiment relates to an apparatus for fabricating a lens, a method of fabricating the lens, and the lens.

BACKGROUND ART

Recently, as a mobile appliance such as a cellar phone equipped with a camera has been introduced, still images and moving pictures can be taken regardless of time and location.

In addition, for high-resolution and high-quality photographs, the performance of the camera has been gradually improved, and a camera module having an auto-focusing function, a close-up shot function, and an optical zoom-in/zoom-out function has been mounted.

In order to ensure the performance of the mounted camera module, the size of the camera module must be enlarged.

However, if the camera module is enlarged, mounting the camera module on the mobile appliance is difficult when taking into consideration the design of the mobile appliance, and the mobile appliance represents the limitation in performance thereof.

If a liquid-phase curing material is used when the lens for the camera module is fabricated, the lens is fabricated as a wafer-type lens due to the low viscosity of the liquid-phase curing material. However, even though the wafers are aligned at desirable positions thereof when the wafers are stacked, the lenses may be de-centered due to the contraction of the materials. Accordingly, the product yield may be degraded, and the problems related to the modulation of the wafer-type lens may occur.

The de-center phenomenon occurs when the center of one curved surface of a lens is mismatched with the center of the other curved surface of the lens, and the performance of the lens may be degraded due to the de-center phenomenon. In other words, even though the center of the top surface of the lens must be aligned in line with the center of the bottom surface of the lens, when the upper and lower portions of the lens are cured at different speeds in the step of curing the lens by irradiating light or heat in the middle of a molding process for the lens, the upper portion of the lens may be offset from the lower portion of the lens, so that the performance of the lens may be degraded.

Therefore, a method of fabricating a novel lens, capable of achieving the mass production of the lens by using a liquid-phase curing material and reducing and/or preventing the de-center phenomenon, and an apparatus for fabricating the lens have been required.

DISCLOSURE

Technical Problem

The embodiment provides a method of fabricating a lens in which the mass production of a lens having a desirable curvature can be achieved.

In addition, the embodiment provides an apparatus for fabricating the lens.

Further, the embodiment provides a lens having at least two surfaces including flat surfaces or cutting surfaces.

Technical Solution

According to the embodiment, there is provided an apparatus for fabricating a lens, which includes a molding frame to receive a source material injected through an injection port, and a light source or a heat source to irradiate a light or a heat onto the source material in the molding frame. The molding frame includes a plurality of molding grooves adjacent to each other and at two connection passages to connect the molding grooves to each other.

According to the embodiment, there is provided a method of fabricating a lens, which includes injecting a source material into a molding frame through an injection port of the molding frame including a plurality of molding grooves adjacent to each other and at least two connection passages connecting the molding grooves to each other, applying a pressure to the source material, and irradiating a light or a heat to the source material. The source material is filled in the molding grooves through the connection passages.

According to the embodiment, there is provided a lens including a lens part having a predetermined curvature, and a support part extending from the lens part. The support part includes at least two flat surfaces or at least cutting surfaces.

Advantageous Effects

As described above, according to the apparatus for fabricating the lens and the method of fabricating the lens according to the embodiment, the lens for the camera module having a complex and fine structure can be provided. In particular, according to the method of fabricating the lens for the camera module of the embodiment, the connection passages to connect the molding grooves, which are used to form the lens, to each other can be provided.

In addition, according to the apparatus for fabricating the lens and the method of fabricating the lens of the embodiment, the molding frame includes the molding grooves and the connection passages, which construct a mesh structure and are filled with the photo-curable resin composition to fabricate the lens array substrate and cut the lens array substrate, thereby producing the lenses. Accordingly, the mass production of the lenses can be produced.

In addition, according to the apparatus for fabricating the lens and the method of fabricating the lens of the embodiment, the photo-curable resin composition is filled in the molding grooves through the connection passages. In other words, at least two connection passages are connected to the molding grooves, and the composition can be more uniformly distributed and filled in the molding grooves through the connection passages. Accordingly, when the lens is fabricated, the production yield can be improved.

MODE FOR INVENTION

Figure 1:
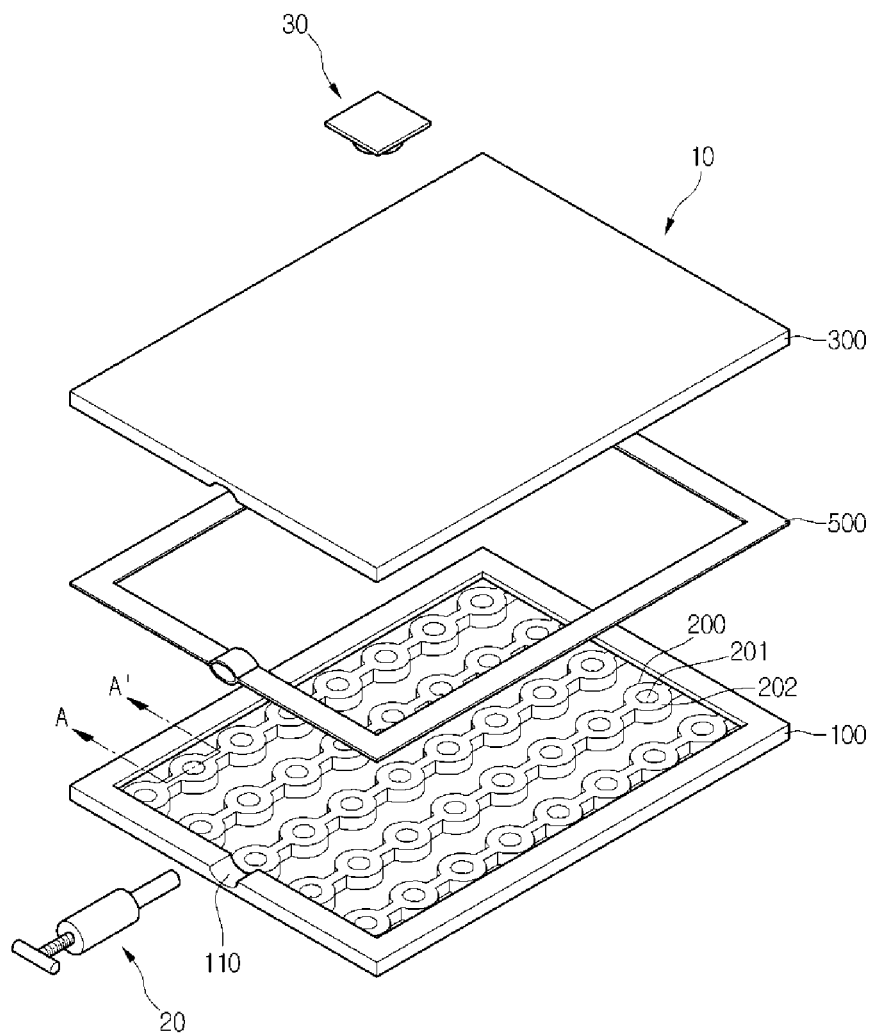
FIG. 1 is an exploded perspective view showing an apparatus for fabricating a lens according to the embodiment.

In the description of the embodiments, it will be understood that, when a lens, a unit, a part, a hole, a protrusion, a groove, or a layer is referred to as being "on" or "under" another lens, another unit, another part, another hole, another protrusion, another groove, or another layer, it can be "directly" or over the other lens, the other unit, the other part, the other hole, the other protrusion, the other groove, or the other layer, or one or more intervening layers may also be present. In addition, the positions of each component will be described with reference to accompanying drawings. Since the thickness and size of each component shown in the drawings may be modified for the purpose of convenience or clarity of description, the size of elements does not utterly reflect an actual size.

Figure 2:
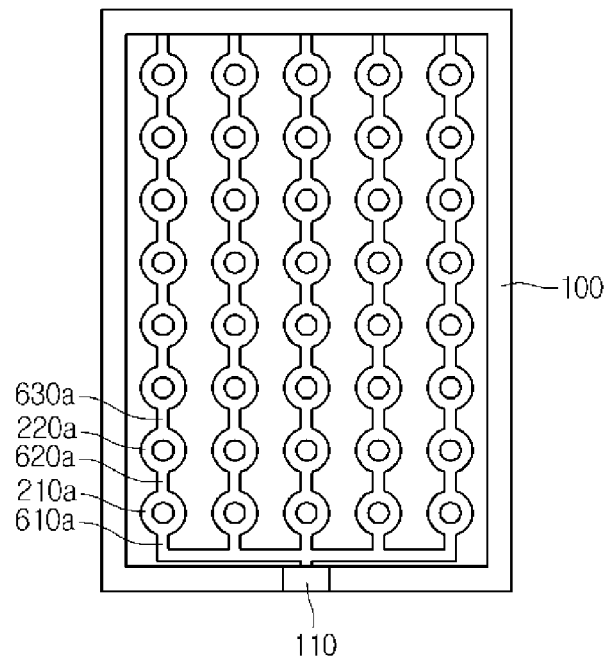
FIG. 2 is a view showing a lower molding groove according to a first embodiment.
Figure 3:
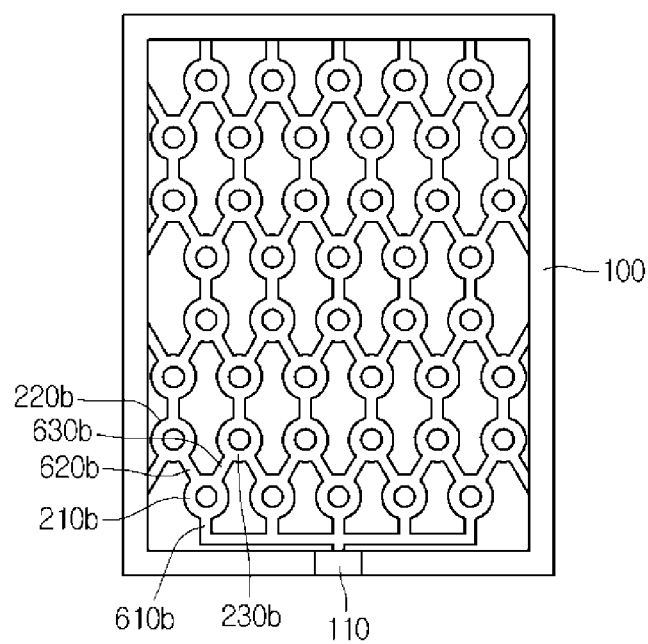
FIG. 3 is a view showing a lower molding groove according to a second embodiment.
Figure 4:
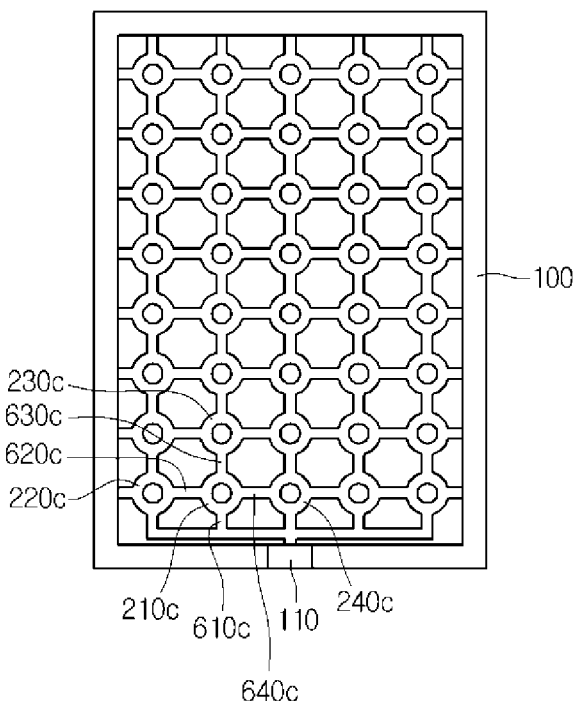
FIG. 4 is a view showing a lower molding groove according to a third embodiment.
Figure 5:
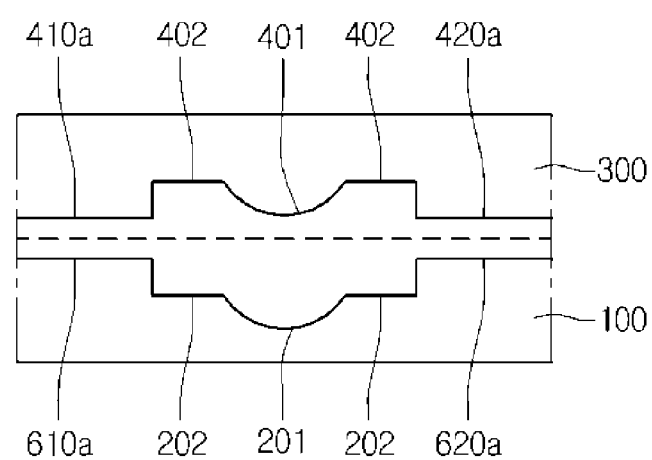
FIG. 5 is a sectional view taken along line A-A' of FIG. 1.
Figure 6:
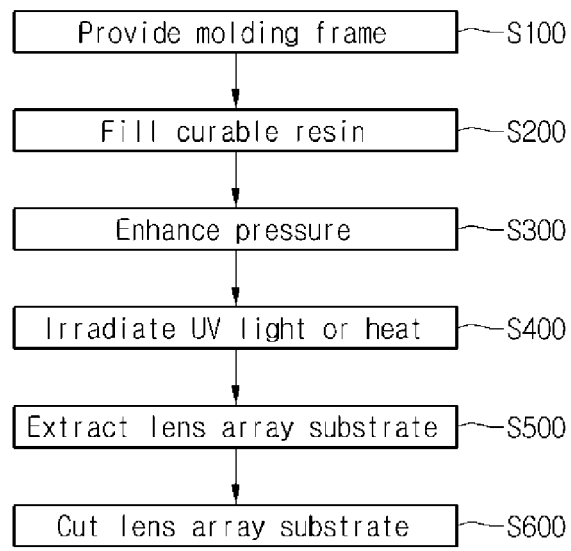
FIG. 6 is a flowchart showing a method of fabricating a lens according to the embodiment.
Figure 7:
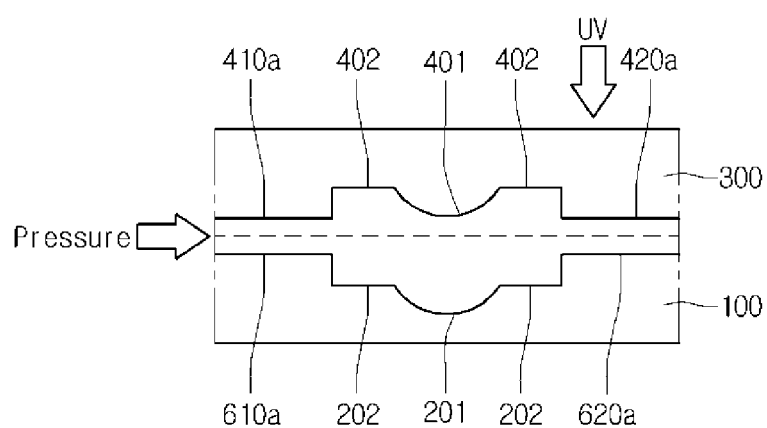
FIG. 7 is a sectional view showing a curing step and a pressing step.
Figure 8:
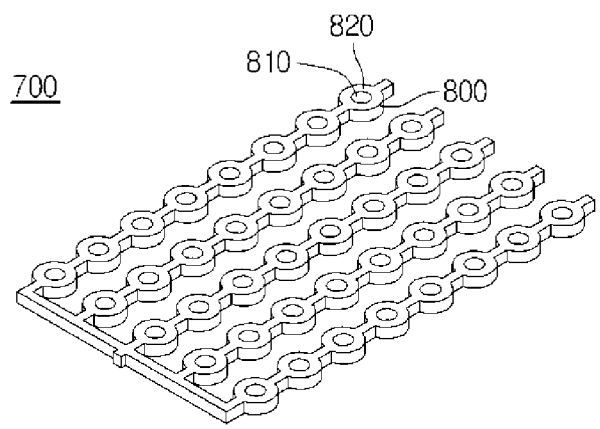
FIG. 8 is a perspective view showing a lens array substrate fabricated through the method of fabricating the lens according to the first embodiment.
Figure 9:
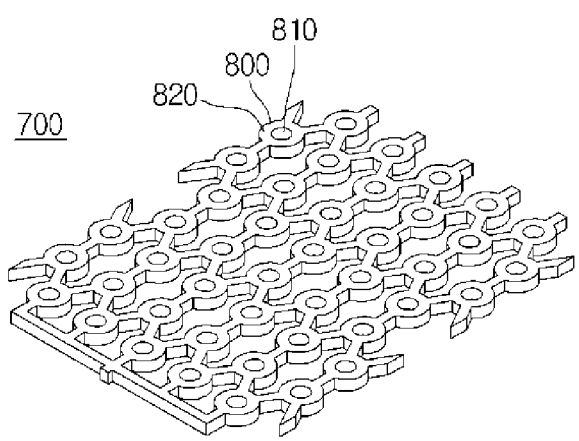
FIG. 9 is a perspective view showing a lens array substrate fabricated through the method of fabricating the lens according to the second embodiment.
Figure 10:
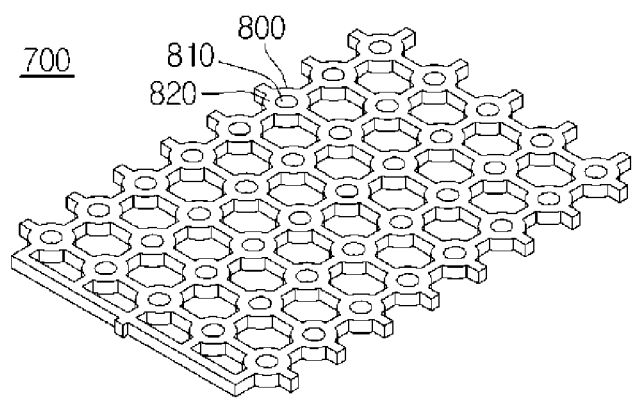
FIG. 10 is a perspective view showing a lens array substrate fabricated through the method of fabricating the lens according to the third embodiment.
Figure 11:
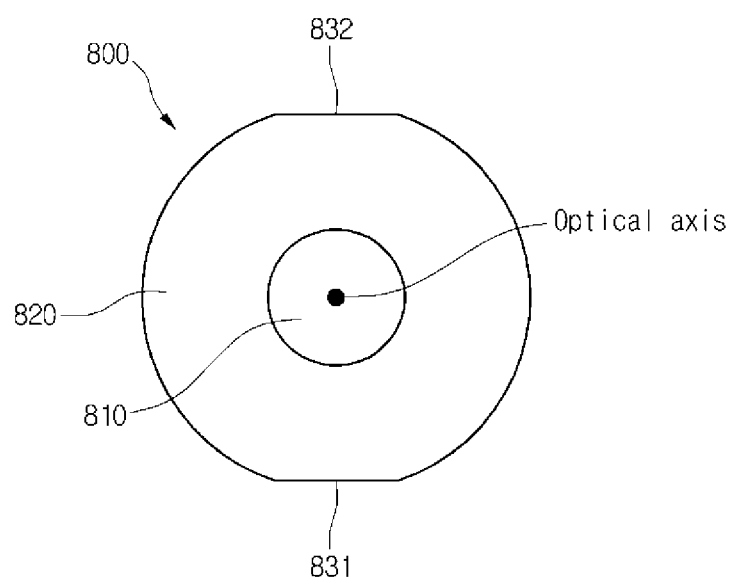
FIG. 11 is a view showing the lens according to the first embodiment.
Figure 12:
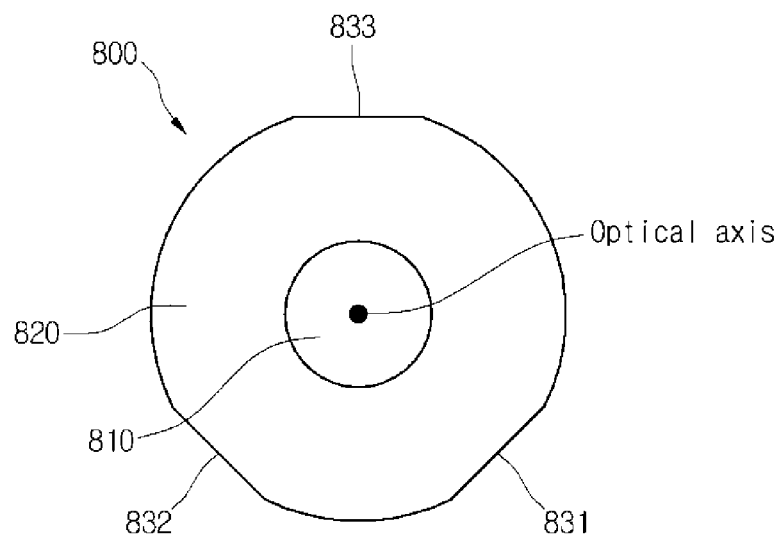
FIG. 12 is a view showing the lens according to the second embodiment.
Figure 13:
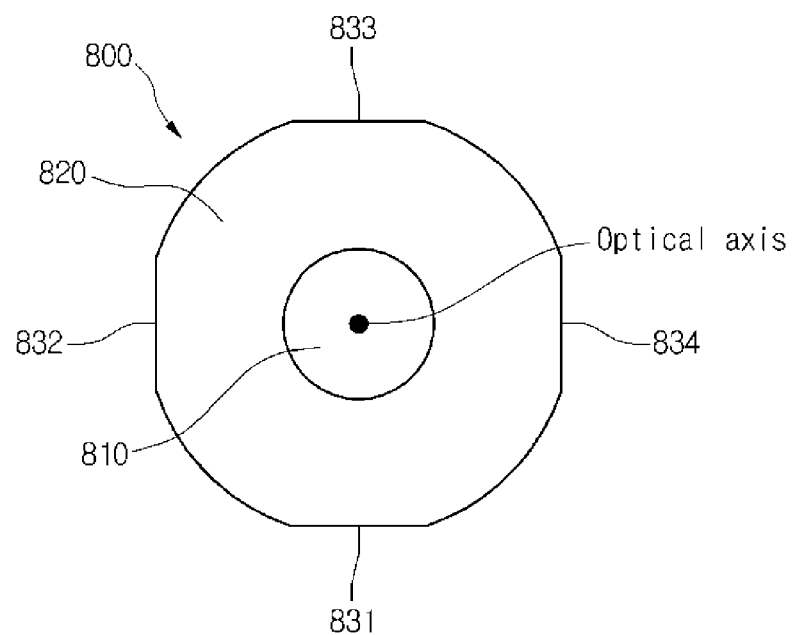
FIG. 13 is a view showing the lens according to the third embodiment.

FIG. 1 is an exploded perspective view showing an apparatus for fabricating a lens according to the embodiment, FIG. 2 is a view showing a lower molding groove according to a first embodiment, and FIG. 3 is a view showing a lower molding groove according to a second embodiment. FIG. 4 is a view showing a lower molding groove according to a third embodiment, FIG. 5 is a sectional view taken along line A-A' of FIG. 1, and FIG. 6 is a flowchart showing a method of fabricating a lens according to the embodiment. FIG. 7 is a sectional view showing a curing step and a pressing step, FIG. 8 is a perspective view showing a lens array substrate fabricated through the method of fabricating the lens according to the first embodiment, and FIG. 9 is a perspective view showing a lens array substrate fabricated through the method of fabricating the lens according to the second embodiment. FIG. 10 is a perspective view showing a lens array substrate fabricated through the method of fabricating the lens according to the third embodiment, FIG. 11 is a view showing the lens according to the first embodiment, FIG. 12 is a view showing the lens according to the second embodiment, and FIG. 13 is a view showing the lens according to the third embodiment.

Referring to FIGS. 1 to 5, the apparatus for fabricating the lens according to the embodiment includes a molding frame 10, a pressure holding device 20, and a curing device 30.

A portion or an entire portion of the molding frame 10 is transparent. The molding frame 10 includes a lower molding frame 100, lower molding grooves 200, an upper molding frame 300, upper molding grooves 400, a sealing member 500, and connection passages.

The molding frame 10 includes the lower molding frame 100 and the upper molding frame 300. In other words, the molding frame 10 may be formed by integrally coupling the lower molding frame 100 with the upper molding frame 300. In addition, the molding frame 10 includes an injection port 110 used to inject a source material.

The lower molding frame 100 is coupled with the upper molding frame 300. In addition, the lower molding frame 100 has a shape symmetric to that of the upper molding frame 300.

The lower molding frame 100 has the shape of a rectangular frame having an open upper portion. The lower molding frame 100 is transparent or opaque. The lower molding frame 100 may include a material such as metal, glass, or plastic.

The lower molding grooves 200 are provided inside the lower molding frame 100. In more detail, the lower molding grooves 200 are arranged in the shape of a mesh inside the lower molding frame. The lower molding grooves 200 are opaque or transparent. The lower molding grooves 200 may include a material such as metal, glass, or plastic. Each lower molding groove 200 includes a concave surface 201 and a molding body surrounding the concave surface 201. The concave surface 201 and the molding body 202 may be integrally formed with each other.

The lower molding frame 100 may be integrally formed with the lower molding grooves 200. In addition, the lower molding grooves 200 may be integrally formed with each other.

The lower molding grooves 200 may be connected to each other through a plurality of connection passages. In detail, the lower molding grooves 200 may include at least two connection passages. In addition, the at least two connection passages may connect the lower molding grooves 200 to each other.

Hereinafter, the apparatus for fabricating the lens according to various embodiments will be described. In other words, hereinafter, the apparatus for fabricating the lens according to various embodiments depending on the directions and the arrangement of the molding grooves.

Referring to FIG. 2, according to the apparatus for fabricating the lens of the first embodiment, each lower molding groove 200 includes two connection passages. The lower molding grooves 200 may be connected to each other in various directions through the connection passages. In other words, each lower molding groove 200 may include two connection passages to the lower molding grooves 200 to each other.

The connection passages may include a first connection passage 610a, a second connection passage 620a, and a third connection passage 630a. The first and second connection passages 610a and 620a are connected to the lower molding grooves 200. The first and second connection passages 610a and 620a are connected to the lower molding grooves 200, respectively, and the lower molding grooves 200 may be connected to each other through the connection passages. In other words, the lower molding grooves 200 may include a first molding groove 210a and a second molding groove 220a, the first molding groove 210a may include the first and second connection passages 610a and 620a, and the second molding groove 220a may include the second connection passage 620a and the third connection passage 630a.

The first connection passage 610a may be connected with the injection port 110 of the molding frame 100. In addition, the second connection passage 620a may be connected with the first molding groove 210a and the second molding groove 220a. In other words, the first and second molding grooves 210a and 220a may include the second connection passage 620a, and the first and second molding grooves 210a and 220a may be connected to each other through the second connection passage 620a. In addition, the third connection passage 630a may connect the second molding groove 220a to another molding groove.

In addition, the first connection passage 610a, the second connection passage 620a, and the third connection passage 630a may make a linear connection. In other words, the first connection passage 610a, the second connection passage 620a, and the third connection passage 630a are connected to the first and second molding grooves 210a and 220a in substantially parallel to each other.

Although the above description is made with respect to portions of the molding grooves and the connection passages shown in FIG. 2, the description of the other portions of the molding grooves and the connection passages shown in FIG. 2 will be incorporated in the above description of the portions of the molding grooves and the connection passages shown in FIG. 2.

Referring to FIG. 3, according to the apparatus of fabricating the lens of the second embodiment, the lower molding grooves include three connection passages. The lower molding grooves may be connected to each other in various directions through the connection passages. In other words, the lower molding grooves may include three connection passages to connect the lower molding grooves to each other.

In detail, the lower molding grooves may include a first molding groove 210b, a second molding groove 220b, and a third molding groove 230b. The first molding groove 210b may include a first connection passage 610b, a second connection passage 620b, and a third connection passage 630b. The first connection passage 610b, the second connection passage 620b, and the third connection passage 630b may be connected to the first molding groove 210b while making a predetermined interval from each other. For example, the first connection passage 610b, the second connection passage 620b, and the third connection passage 630b may be connected to the first molding groove 210b while forming a Y shape. However, the embodiment is not limited thereto, but the first connection passage 610b, the second connection passage 620b, and the third connection passage 630b may be connected to the first molding groove 210b in various directions while forming various shapes.

The first connection passage 610b may be connected to the injection port 110 of the molding frame. In other words, the first connection passage 610b is connected to the injection port 110 used to inject the source material, and the source material may be filled in the first molding groove 210b through the first connection passage 610b. In addition, the second connection passage 620b may be connected to the second molding groove 220b, and the third connection passage 630b may be connected to the third molding groove 230b. Therefore, the source material, which has been moved to the first molding groove 210b, may be moved to the second molding groove 220b and the third molding groove 230b through the second and third connection passages 620b and 630b.

In other words, the first connection passage 610b extends toward the injection port 100, the second connection passage 620b extends from the first molding groove 210b toward the second molding groove 220b, and the third connection passage 630b may extend from the first molding groove 210b toward the third molding groove 230b.

In addition, the angle between the first and second connection passages 610b and 620b, the angle between the first and third connection passages 610b and 630b, and the angle between the second and third connection passages 620b and 630b may be in a predetermined range. In more detail, the predetermined range may be the range of about 110° to 130°.

In addition, the angle may be 120°. In other words, the angle between the first and second connection passages 610b and 620b, the angle between the first and third connection passages 610b and 630b, and the angle between the second and third connection passages 620b and 630b may be substantially equal to each other.

Although the above description is made with respect to portions of the molding grooves and the connection passages shown in FIG. 3, the description of the other portions of the molding grooves and the connection passages shown in FIG. 3 will be incorporated in the above description of the portions of the molding grooves and the connection passages shown in FIG. 3.

Referring to FIG. 4, according to the apparatus of fabricating the lens of the third embodiment, the lower molding grooves include four connection passages. The lower molding grooves may be connected to each other in various directions through the connection passages. In other words, the lower molding grooves may include four connection passages to connect the lower molding grooves to each other.

In detail, the lower molding grooves may include a first molding groove 210c, a second molding groove 220c, a third molding groove 230c, and a fourth molding groove 240c. The first molding groove 210c may include a first connection passage 610c, a second connection passage 620c, a third connection passage 630c, and a fourth connection passage 640c. The first connection passage 610c, the second connection passage 620c, the third connection passage 630c, and the fourth connection passage 640c may be connected to the first molding groove 210c while making a predetermined interval from each other. For example, the first connection passage 610c, the second connection passage 620c, the third connection passage 630c, and the fourth connection passage 640c may be connected to the first molding groove 210c while forming a + shape. However, the embodiment is not limited thereto, but the first connection passage 610c, the second connection passage 620c, the third connection passage 630c, and the fourth connection passage 640c may be connected to the first molding groove 210c in various directions while forming various shapes.

The first connection passage 610c may be connected to the injection port 110 of the molding frame. In other words, the first connection passage 610c is connected to the injection port 110 used to inject the source material, and the source material may be filled in the first molding groove 210c through the first connection passage 610c. In addition, the second connection passage 620c may be connected to the second molding groove 220c, the third connection passage 630c may be connected to the third molding groove 230c, and the fourth connection passage 640c may be connected to the fourth molding groove 240c. Therefore, the source material, which has been moved to the first molding groove 210c, may be moved to the second molding groove 220c, the third molding groove 230c, and the fourth molding groove 240c through the second, third, and fourth connection passages 620c, 630c, and 640c.

In other words, the first connection passage 610c extends toward the injection port 100, the second connection passage 620c extends from the first molding groove 210c toward the second molding groove 220c, the third connection passage 630c may extend from the first molding groove 210c toward the third molding groove 230c, and the fourth connection passage 640c may extend from the first molding groove 210c toward the fourth molding groove 240c.

In addition, the angle between the first and second connection passages 610c and 620c, the angle between the second and third connection passages 620c and 630c, the angle between the third and fourth connection passages 630c and 640c, and the angle between the fourth and first connection passages 640c and 610c may be in a predetermined range. In more detail, the predetermined range may be the range of about 80° to 100°.

In addition, the angle may be 90°. In other words, the angle between the first and second connection passages 610c and 620c, the angle between the second and third connection passages 620c and 630c, the angle between the third and fourth connection passages 630c and 640c, and the angle between the fourth and first connection passages 640c and 610c may be substantially equal to each other.

Although the above description is made with respect to portions of the molding grooves and the connection passages shown in FIG. 4, the description of the other portions of the molding grooves and the connection passages shown in FIG. 4 will be incorporated in the above description of the portions of the molding grooves and the connection passages shown in FIG. 4.

Although the first to third embodiments have been described with respect to only the first to fourth molding grooves and the first to fourth connection passages, the embodiments are not limited thereto. In other words, the apparatus for fabricating the lens according to the first embodiment may include a plurality of molding grooves and a plurality of connection passages constructing a mesh structure in addition to a fifth molding groove and a fifth connection passages, and the molding grooves and the connection passages may construct a mesh structure in various directions while forming various patterns.

The upper molding frame 300 may have a shape corresponding to that of the lower molding frame 100. In other words, the upper molding frame 300 includes upper molding grooves having the shapes and the sizes the same as those of the lower molding grooves of the lower molding frame 100. Hereinafter, the description of the upper molding frame 300 and the upper molding grooves will be incorporated in the above description of the lower molding frame 100 and the lower molding grooves.

The upper molding grooves 400 are provided inside the upper molding frame 300. The upper molding frame 300 and the upper molding grooves 400 may be integrally formed with each other. Similarly to the lower molding grooves 200, the upper molding grooves 400 include a plurality of connection passages and a plurality of molding grooves. In other words, the lower molding grooves include a plurality of concave surfaces 401, a molding body 402, and connection packages 410a and 420a.

In addition, the upper molding groove 400 corresponds to the concave surface 201 and the molding body 202 of the lower molding groove 200. In other words, the molding grooves and the connection passages of the upper molding groove 400 may correspond to the molding grooves and the connection passages of the lower molding groove 200.

Hereinafter, a method of fabricating a lens according to the embodiment will be described with reference to FIGS. 6 to 10.

Referring to FIG. 6, the fabrication process of the lens by the apparatus for fabricating the lens according to the embodiment is as follows.

First, the lower molding frame 100 is coupled with the molding frame 10 by a coupling unit (step S100).

Thereafter, photo-curable resin composition and/or thermosetting resin composition are prepared. The photo-curable resin composition and/or the thermosetting resin composition may be prepared by mixing a photo-curable monomer and/or a thermosetting resin monomer and a thermosetting initiator and/or a photo-curable initiator.

The photo-curable monomer may be prepared by mixing various monomers with each other.

The photo-curable monomer may include 2-butoxyethyl acrylate, ethylene glycol phenyl ether acrylate, 2-butoxyethyl methacrylate, ethylene glyco phenyl ether methacrylate, 2-hydorxyethyl methacrylate, isodecyl methacrylate, phenyl methacrylate, bisphenol A propoxylate diacrylate, 1,3(1,4)-butandiol diacrylate, 1,6-hexandiol ethoxylate diacrylate, neophenyl glycol diacrylate, ethylene glycol diacrylate, di-(ethylene glycol)diacrylate, tetra ethylene glycol diacrylate, 1,3(1,4)-butanediol dimethacrylate, diurethane dimethacrylate, grycerol dimethacrylate, ethylene glycol dimethacrylate, di-(ethylene glycol)dimethacrylate, tri(ethylene glycol)dimethacrylate, 1,6-hexandiol dimethacrylate, glycerol propoxylate triacrylate, pentaerythritol propoxylate triacrylate, ditrimetylolpropane tetra-acrylate and pentaerythritol tetra-acrylate.

The photo-curable initiator and/or the thermosetting initiator are materials decomposed into radicals through the irradiation of light such as ultraviolet light or heat thereon to initiate cross-linking and curing reactions of the photo-curable resin composition and/or the thermosetting resin composition. The photo-curable initiator and/or the thermosetting initiator is adjustably selected in the type and the contents thereof by taking into consideration the curing reaction speed of the resin composition, a discoloration characteristic, and the attachment degree to a base. If necessary, at least two may be mixed with each other for the use.

The photo-curable initiator may include α-hydroxyketone, phenylglyoxylate, benzildimethyl ketal, α-aminoketone, mono acyl phosphine, bis acyl phosphine, 2,2-dimethoxy-2-phenylacetophenone, and the compound thereof.

The photo-curable initiator may include 2,2-azobis(isobutyronitrile).

The photo-curable initiator and/or the thermosetting initiator may be mixed with the content of about 0.1 wt % to about 0.3 wt % based on the resin composition.

Thereafter, the photo-curable resin composition and/or the thermosetting resin composition are filled in the molding frame 10 (step S200).

The photo-curable resin composition is filled in the molding frame 10, and filled in the lower molding grooves 200, which are formed in the lower molding frame 100, through the connection passages.

In detail, the lower molding grooves include a first molding groove, a second molding groove, and a third molding groove. In addition, the connection passages include a first connection passage, a second connection passage, and a third connection passage. Thereafter, the curable resin composition is moved to the first molding groove through the injection port and the first connection passage. Thereafter, the curable resin composition is moved from the first molding groove to the second molding groove through the second connection passage, and moved from the second molding groove to the third molding groove through the third connection passage.

In addition, the lower molding grooves include first to fourth molding grooves. In addition, the connection passages include first to fourth connection passages. Then, after the curable resin composition is moved to the first molding groove through the injection port and the first connection passage, the thermosetting resin composition is moved from the first molding groove to the second molding groove through the second connection passage. Thereafter, the thermosetting resin composition is moved from the first molding groove to the third molding groove through the third connection passage. Next, the thermosetting resin composition is moved from the first molding groove to the fourth molding groove through the fourth connection passage.

In other words, the curable composition may be sequentially filled in the molding grooves through the connection passages connecting the molding grooves to each other. Therefore, the curable resin composition may be effectively filled in the molding grooves.

Although the above description is made in terms of the first to fourth molding grooves and the first to fourth connection passages, the embodiment is not limited thereto. Accordingly, the curable resin composition may be filled in the molding grooves through a plurality of molding grooves and a plurality of connection passages to connect the molding grooves to each other.

Referring to FIG. 7, pressure is applied to the curable resin composition by the pressure holding device 20 (step S300). Thereafter, the curing device 30 irradiates ultraviolet light or heat onto the curable resin composition through the upper molding frame 300 (step S400).

In addition, while ultraviolet light is irradiated on the curable resin composition, the pressure of about 6000 psi to about 15000 psi may be applied to the photo-curable resin composition through the injection port 11.

In other words, the curing step S400 and the pressure holding step S300 are simultaneously performed.

Since the upper molding frame 300 and the second core 400 are transparent, the ultraviolet light can be easily irradiated to the photo-curable resin composition. The ultraviolet light is irradiated with the intensity of about 1.5 mW/cm$^2$ to 5.5 mW/cm$^2$ for about 18 minutes to about 23 minutes. In addition, the intensity of the ultraviolet light and the irradiation time may be varied according to the types of the photo-curable resin composition.

In addition, during the curing step S400, the intensity of the ultraviolet light or the intensity of heat applied to the curable resin composition may be varied according to the time.

For example, in the curing step S400, the intensity of the ultraviolet or the intensity of the heat irradiated onto the curable resin composition is 1.5 mW/cm$^2$ for about 5 minutes to 10 minutes. Thereafter, the intensity of the ultraviolet or the intensity of the heat is about 3.5 mW/cm$^2$ for about 5 minutes to about 10 minutes, and then the intensity of the ultraviolet or the intensity of the heat may be 5.5 mW/cm$^2$ for about 2 minutes to about 5 minutes.

Further, the pressure holding step S300 may be performed in the middle of curing the curable resin composition.

In addition, during the pressure holding step S300, the pressure applied to the curable resin composition may be varied with the lapse of time.

For example, in the pressure holding step S300, pressure having the intensity of 15000 psi is applied to the curable resin composition for about 10 minutes to about 15 minutes. Thereafter, pressure having the intensity of 10000 psi is applied to the curable resin composition for about 5 minutes to about 10 minutes, and then pressure having the intensity of 500 psi is applied to the curable resin composition for about 2 minutes to about 5 minutes.

In addition, as the pressure holding step S300 is performed, the pressure applied to the curable resin composition may be gradually increased, gradually decreased, or gradually decreased after the pressure has been increased with the lapse of time.

In addition, the pressure holding step S300 may be performed after the curing step S400 has been performed.

In addition, a primary pressure holding step may be performed before the curing step S400 is performed, and the curing step and a secondary pressure holding step may be simultaneously performed. In other words, in the state that the pressure applied to the curable resin composition is increased, the ultraviolet light or heat may be irradiated onto the curable resin composition.

Thereafter, the curable resin composition is cured by the ultraviolet light or heat. In this case, since the photo-curable resin composition represents high pressure, the photo-curable resin composition is not contracted when the photo-curable resin composition is subject to the curing step.

Thereafter, the upper molding frame 300 is open, and a lens array substrate 700 formed inside the molding frame 10 is extracted from the upper molding frame 300 (step S500).

Referring to FIGS. 8 to 10, the lens array substrate 700 includes a plurality of lens 800 connected to each other through connection passages of the lens array substrate 700.

Then, after the lens array substrate 700 is cut, and the connection passages are cut, the lenses 800 are formed (step S600).

Hereinafter, the lenses 800 according to the embodiment will be described with reference to FIGS. 11 to 13.

Referring to FIGS. 11 to 13, the lens 800 according to the embodiment includes a lens part 810 and a support part 820 extending from the lens part 810. The support part 820 includes at least two flat surfaces. In addition, the lens part 810 is integrally formed with the support part 820, and the lens part 810 and the support part 820 include curable resin. The curable resin is originally incorporated in the curable resin composition described above.

FIG. 11 is a view showing a lens according to a first embodiment. Referring to FIG. 11, the lens according to the embodiment includes the lens part 810 and the support part 820, and the support part 820 includes a first flat surface 831 and a second flat surface 832. In addition, the support part 820 includes first and second cutting surfaces. In other words, the flat surface may include a cutting surface. The lens part 810 may be integrally formed with the support part 820. The flat surfaces or the cutting surfaces are formed by removing the connection passages after the lens unit array substrate has been fabricated.

The first flat surface or the first cutting surface and the second flat surface or the second cutting surface may be linearly formed in line with each other. In more detail, a first line extending from an optical axis of the lens to the first flat surface or the first cutting surface may be linearly formed in line with a second line extending from the optical axis of the lens from the second flat surface or the second cutting surface.

FIG. 12 is a view showing a lens according to a second embodiment. Referring to FIG. 12, the lens according to the embodiment includes the lens part 810 and the support part 820, and the support part 820 includes a first flat surface 831, a second flat surface 832, and a third flat surface 833. In addition, the support part 820 includes first to third cutting surfaces. In other words, the flat surface may include a cutting surface. The lens part 810 may be integrally formed with the support part 820. The flat surfaces or the cutting surfaces are formed by removing the connection passages after the lens unit array substrate has been fabricated.

The flat surfaces or the cutting surfaces may be formed at a predetermined interval. In detail, an angle between a first line extending from an optical axis of the lens to the first flat surface or the first cutting surface and a second line extending from the optical axis of the lens to the second flat surface or the second cutting surface, an angle between the second line extending from the optical axis of the lens to the second flat surface or the second cutting surface and a third line extending from the optical axis of the lens to the third flat surface or the third cutting surface, and an angle between the first line extending from the optical axis of the lens to the first flat surface or the first cutting surface and the third line extending from the optical axis of the lens to the third flat surface or the third cutting surface may be in the range of 110° to 130°.

FIG. 13 is a view showing a lens according to a third embodiment. Referring to FIG. 13, the lens according to the embodiment includes the lens part 810 and the support part 820, and the support part 820 includes a first flat surface 831, a second flat surface 832, a third flat surface 833, and a fourth flat surface 834. In addition, the support part 820 includes first to fourth cutting surfaces. In other words, the flat surface may include a cutting surface. The lens part 810 may be integrally formed with the support part 820. The flat surfaces or the cutting surfaces are formed by removing the connection passages after the lens unit array substrate has been fabricated.

The flat surfaces or the cutting surfaces may be formed at a predetermined interval. In detail, an angle between a first line extending from an optical axis of the lens to the first flat surface or the first cutting surface and a second line extending from the optical axis of the lens to the second flat surface or the second cutting surface, an angle between the second line extending from the optical axis of the lens to the second flat surface or the second cutting surface and a third line extending from the optical axis of the lens to the third flat surface or the third cutting surface, an angle between the third line extending from the optical axis of the lens to the third flat surface or the third cutting surface and a fourth line extending from the optical axis of the lens to a fourth flat surface or a fourth cutting surface, and an angle between the fourth line extending from the optical axis of the lens to the fourth flat surface or the fourth cutting surface and the first line extending from the optical axis of the lens to the first flat surface or the first cutting surface may be in the range of 80° to 100°.

Although the first to third embodiments have been described in terms of the support part including the first to fourth flat surfaces or the first to fourth cutting surfaces, the embodiments are not limited thereto. In other words, the support part may include a plurality of flat surfaces or a plurality of cutting surfaces spaced part from each other by a predetermined interval.

The lens according to the embodiment may include a support part having various shapes. The lens may include the support part having various shapes according to the arrangement and the directions of the connection passages. Therefore, when the lens unit according to the embodiment is applied to the camera module, the limitation of the lens caused by the shape of the lens can be reduced.

In addition, the apparatus for fabricating the lens and the method of fabricating the lens according to the embodiment can provide a lens for a camera module representing a complex and micro-structure. In particular, according to the method of fabricating the lens for the camera module of the embodiment, a connection passage, which connects molding grooves used to form the lens, may be provided.

In addition, according to the apparatus for fabricating the lens and the method of fabricating the lens of the embodiment, after the molding grooves and the connection passages, which construct a mesh structure, are provided in the molding frame, the curable resin composition is filled in the molding frame, thereby fabricating the lens array substrate. Since the lenses are produced by cutting the lens array substrate, the mass production of the lenses can be achieved.

Further, according to the apparatus for fabricating the lens and the method of fabricating the lens of the embodiment, the curable resin composition is filled in the molding grooves through the connection passages. In other words, at least two connection passages are connected to the molding grooves, and the composition can be more uniformly distributed and filled into the molding grooves through the connection passages. Accordingly, when the lenses are fabricated, the product yield can be improved.

In addition, according to the apparatus for fabricating the lens and the method of fabricating the lens of the embodiment, the resin composition is uniformly filled in the molding grooves through the connection passages and cured, thereby reducing the de-center phenomenon. In other words, the apparatus for fabricating the lens and the method of fabricating the lens of the embodiment can reduce the de-center phenomenon to about 5 μm or less.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An apparatus for fabricating a lens, comprising:
a molding frame to receive a source material injected through an injection port; and
a light source or a heat source to irradiate a light or a heat onto the source material in the molding frame,
wherein the molding frame comprises a plurality of molding grooves adjacent to each other and at two connection passages to connect the molding grooves to each other.

2. The apparatus of claim 1, wherein the molding grooves include a first molding groove and a second molding groove, the first molding groove includes a first connection passage and a second connection passage, the second molding groove includes the second connection passage and a third connection passage, and the first molding groove and the second molding groove are connected to each other through the second connection passage.

3. The apparatus of claim 1, wherein the molding grooves include a first molding groove, a second molding groove, and a third molding groove, the first molding groove includes a first connection passage, a second connection passage, and a third connection passage, the first molding groove is connected to the second molding groove through the second connection passage, and the first molding groove is connected to the third molding groove through the third connection passage.

4. The apparatus of claim 3, wherein the first connection passage extends from the first molding groove to the injection port, the second connection passage extends from the first molding groove to the second molding groove, and the third connection passage extends from the first molding groove to the third molding groove, and
   wherein an angle between the first and second connection passages, an angle between the first and third connection passages, and an angle between the second and third connection passages are in a range of 110° to 130°.

5. The apparatus of claim 4, wherein the angle between the first and second connection passages, the angle between the first and third connection passages, and the angle between the second and third connection passages are 120°.

6. The apparatus of claim 1, wherein the molding grooves include a first molding groove, a second molding groove, a third molding groove, and a fourth molding groove, and the first molding groove includes a first connection passage, a second connection passage, a third connection passage, and a fourth connection passage, and
   wherein the first molding groove is connected to the second molding groove through the second connection passage, connected to the third molding groove through the third connection passage, and connected to the fourth molding groove through the fourth connection passage.

7. The apparatus of claim 6, wherein the first connection passage extends from the first molding groove to the injection port, the second connection passage extends from the first molding groove to the second molding groove, the third connection passage extends from the first molding groove to the third molding groove, the fourth connection passage extends from the first molding groove to the fourth molding groove, and
   wherein an angle between the first and second connection passages, an angle between the second and third connection passages, and an angle between the first and fourth connection passages are in a range of 80° to 100°.

8. The apparatus of claim 7, wherein the angle between the first and second connection passages, the angle between the second and third connection passages, and the angle between the first and fourth connection passages are 90°.

9. A lens comprising:
   a lens part having a predetermined curvature; and
   a support part extending from the lens part,
   wherein the support part includes a first flat surface, a second flat surface, a third flat surface, a fourth flat surface, a first curved surface between the first flat surface and the second flat surface, a second curved surface between the second flat surface and the third flat surface, a third curved surface between the third flat surface and the fourth flat surface, and a fourth curved surface between the fourth flat surface and the first flat surface,
   wherein an angle between a first line, which extends from an optical axis of the lens part to the first flat surface, and a second line, which extends from the optical axis of the lens part to the second flat surface, is in a range of 80° to 100°,
   wherein an angle between the second line, which extends from the optical axis of the lens part to the second flat surface, and a third line, which extends from the optical axis of the lens part to the third flat surface, is in a range of 80° to 100°,
   wherein an angle between the third line, which extends from the optical axis of the lens part to the third flat surface, and a fourth line, which extends from the optical axis of the lens part to the fourth flat surface, is in a range of 80° to 100°, and
   wherein an angle between the fourth line, which extends from the optical axis of the lens part to the fourth flat surface, and the first line, which extends from the optical axis of the lens part to the first flat surface, is in a range of 80° to 100°.

10. The lens of claim 9, wherein the lens part is integrally formed with the support part, and the lens part and the support part include a photo-curable resin or a thermosetting resin.

11. A lens comprising:
    a lens part having a predetermined curvature; and
    a support part extending from the lens part,
    wherein the support part includes a first cut surface, a second cut surface, a third cut surface, a fourth cut surface, a first curved surface between the first cut surface and the second cut surface, a second curved surface between the second cut surface and the third cut surface, a third curved surface between the third cut surface and the fourth cut surface, and a fourth curved surface between the fourth cut surface and the first cut surface,
    wherein an angle between a first line, which extends from an optical axis of the lens part to the first cut surface, and a second line, which extends from the optical axis of the lens part to the second cut surface, is in a range of 80° to 100°,
    wherein an angle between the second line, which extends from the optical axis of the lens part to the second cut surface, and a third line, which extends from the optical axis of the lens part to the third cut surface, is in a range of 80° to 100°,
    wherein an angle between the third line, which extends from the optical axis of the lens part to the third cut surface, and a fourth line, which extends from the optical axis of the lens part to the fourth cut surface, is in a range of 80° to 100°, and
    wherein an angle between the fourth line, which extends from the optical axis of the lens part to the fourth cut surface, and the first line, which extends from the optical axis of the lens part to the first cut surface, is in a range of 80° to 100°.

* * * * *